US012319542B2

(12) United States Patent
Hutchinson et al.

(10) Patent No.: US 12,319,542 B2
(45) Date of Patent: Jun. 3, 2025

(54) DYNAMIC TRACTIVE DRIVE FOR VERTICAL TRANSPORTATION SYSTEM

(71) Applicant: Hyprlift, Inc., Santa Clara, CA (US)

(72) Inventors: James Boyd Hutchinson, Honolulu, HI (US); Daniel David Johnson, Ann Arbor, MI (US)

(73) Assignee: Hyprlift, Inc., Santa Clara, CA (US)

( * ) Notice: Subject to any disclaimer, the term of this patent is extended or adjusted under 35 U.S.C. 154(b) by 0 days.

(21) Appl. No.: 18/683,484

(22) PCT Filed: Mar. 10, 2023

(86) PCT No.: PCT/US2023/014998

§ 371 (c)(1),
(2) Date: Feb. 13, 2024

(87) PCT Pub. No.: WO2023/172745

PCT Pub. Date: Sep. 14, 2023

(65) Prior Publication Data

US 2025/0002298 A1 Jan. 2, 2025

Related U.S. Application Data

(60) Provisional application No. 63/318,777, filed on Mar. 10, 2022.

(51) Int. Cl.
*B66B 9/02* (2006.01)
*B66B 1/30* (2006.01)
(Continued)

(52) U.S. Cl.
CPC .................. *B66B 9/02* (2013.01); *B66B 1/30* (2013.01); *B66B 1/3446* (2013.01); *B66B 5/0018* (2013.01)

(58) Field of Classification Search
CPC .. B66B 7/04; B66B 9/003; B66B 1/30; B66B 9/02
See application file for complete search history.

(56) References Cited

U.S. PATENT DOCUMENTS 134,698 A * 1/1873 Otis .......................... B66B 7/02 187/408
1,859,483 A * 5/1932 Winslow ................... B66B 9/10 198/798

(Continued)

FOREIGN PATENT DOCUMENTS

EP 3998224 A1 * 5/2022 ........... B66B 11/005
WO 2021081465 A1 4/2021

OTHER PUBLICATIONS

International Search Report and Written Opinion of the International Search Authority in International Application No. PCT/US2023/014998, mailed on Jul. 11, 2023.

*Primary Examiner* — Michael A Riegelman
(74) *Attorney, Agent, or Firm* — Cognition IP, P.C.; Edward Steakley

(57) ABSTRACT

An elevator tractive drive system including a plurality of wheels coupled to an elevator cab. The plurality of wheels are configured to compress into one or more shaft-mounted rails and/or one or more interior shaft wall surfaces. The plurality of wheels are powered by one or more motors coupled to a transmission configured to deliver regulated torque to the plurality of wheels. The system includes various sensors to measure parameters related to kinematics of the cab and/or the plurality of wheels, parameters related to a mass or a weight of the elevator cab and any pay load and/or parameters related to compressive forces generated at a wheel-rail or wheel-shaft interface. A controller is configured to receive input from each of the sensors and activate the at least one actuator and/or motors, to generate or adjust (Continued)

regulated compressive force and associated tractive force delivered at the wheel-rail interface and/or the wheel-shaft interface.

11 Claims, 13 Drawing Sheets

(51) Int. Cl.

| | |
|---|---|
| ***B66B 1/34*** | (2006.01) |
| ***B66B 5/00*** | (2006.01) |

(56) References Cited

U.S. PATENT DOCUMENTS 3,244,258 A * 4/1966 Neidert ..................... B66B 7/02 187/363
3,432,046 A * 3/1969 Krusinski ............ B65G 1/0428 414/284
3,658,155 A * 4/1972 Salter ...................... B66B 9/022 198/798
3,664,523 A * 5/1972 Hagel ....................... B66B 9/00 187/250
3,866,767 A * 2/1975 Zollinger ............. B65G 1/0414 414/281
5,228,820 A * 7/1993 Stansfield ............ B65G 1/0407 414/274
5,464,072 A * 11/1995 Muller ...................... B66B 9/02 182/12
5,558,181 A * 9/1996 Bundo .................... B66B 9/022 187/270
5,566,784 A * 10/1996 Rennetaud ................ B66B 9/02 187/257
5,713,432 A * 2/1998 Richter ............... B66B 11/0206 187/250
5,769,183 A * 6/1998 Richter ..................... B66B 9/02 187/249
5,799,755 A * 9/1998 Wan .................... B66B 11/0407 187/289
7,537,089 B2 * 5/2009 Duenser .................. B66B 9/003 187/382
7,621,376 B2 * 11/2009 Duenser .................... B66B 9/02 187/382
8,863,907 B2 * 10/2014 Studer ..................... B66B 9/022 187/270
9,248,994 B2 * 2/2016 Grundmann ............ B66B 9/003
9,387,758 B2 * 7/2016 Heinen ................... B60L 50/51
9,393,859 B2 * 7/2016 Heinen ................ B62D 5/0418
9,598,265 B1 * 3/2017 Jacobs .................... B66B 9/003
11,027,944 B2 * 6/2021 Bhaskar .............. B66B 11/0407
2004/0126208 A1 * 7/2004 Tawyer ............. H01L 21/67733 414/222.02
2006/0163008 A1 * 7/2006 Godwin .............. B66B 11/0407 187/288
2007/0084672 A1 * 4/2007 Helmle ..................... B66B 7/02 187/270
2014/0190774 A1 * 7/2014 Hsu ......................... B66B 9/003 187/406
2016/0297646 A1 * 10/2016 Piech ...................... B66B 11/04
2017/0008729 A1 * 1/2017 Ginsberg ................ B66B 9/003
2017/0057784 A1 * 3/2017 Witczak .................... B66B 7/02
2017/0066623 A1 * 3/2017 Kuczek ..................... B66B 1/28
2017/0088395 A1 * 3/2017 Roberts ............... B66B 11/0407
2017/0088396 A1 * 3/2017 Fargo ................... H02K 11/215
2017/0158461 A1 * 6/2017 Roberts ............... B66B 11/0407
2017/0305718 A1 * 10/2017 Finschi ................... B66B 9/022
2018/0009632 A1 * 1/2018 Roberts ............... B66B 11/0407
2018/0009636 A1 * 1/2018 Jedryczka ........... B66B 11/0407
2018/0029829 A1 * 2/2018 Piech ........................ B66B 7/02
2018/0244495 A1 * 8/2018 Swaybill ............... B66B 1/3492
2018/0257911 A1 * 9/2018 Gainche .................. B66B 9/003
2018/0319630 A1 * 11/2018 Dayrell ................... B66B 9/003
2018/0362302 A1 * 12/2018 Hollowell ........... B66B 11/0438
2019/0077636 A1 * 3/2019 Bhaskar .................. B66B 9/003
2019/0077637 A1 * 3/2019 Bhaskar .................. B66B 9/003
2021/0221647 A1 * 7/2021 Wong ......................... B66B 9/02
2022/0048729 A1 * 2/2022 Roberts ..................... B66B 9/02
2022/0055865 A1 * 2/2022 Roberts ..................... B66B 9/02
2022/0106166 A1 * 4/2022 Roberts ..................... B66B 9/02
2022/0144590 A1 * 5/2022 Billard .................. B66B 11/043
2022/0177262 A1 * 6/2022 Roberts ................... B66B 1/302
2022/0177274 A1 * 6/2022 Roberts ................... B66B 7/046
2022/0185627 A1 * 6/2022 Zhou ................... B66B 11/0226
2022/0194742 A1 * 6/2022 Roberts ..................... B66B 1/30
2022/0380179 A1 * 12/2022 Hutchinson ............... B66B 9/02
2023/0121073 A1 * 4/2023 Wong ......................... B66B 1/32 187/250
2025/0002298 A1 * 1/2025 Hutchinson ............... B66B 1/30

* cited by examiner

DYNAMIC TRACTIVE DRIVE FOR VERTICAL TRANSPORTATION SYSTEM

FIELD OF INVENTION

This invention relates to vertical transportation systems (i.e., elevators, lifts) which transfer passengers and/or freight within artificially-constructed shafts between destinations at differing heights.

CROSS-REFERENCE TO RELATED APPLICATIONS

This application is a 35 U.S.C. § 371 U.S. National Stage application of International Application No. PCT/US2023/014998, filed on Mar. 10, 2023, which claims the benefit of priority of U.S. Provisional Application No. 63/318,777, filed on Mar. 10, 2022, which are incorporated herein by reference in their entirety.

BACKGROUND

Elevators are vertical transportation systems, usually incorporated into buildings, which rely on the use of cabs: mobile compartments that carry passengers or freight along a set track in a vertical shaft (i.e., hoistway). Traditional elevator cabs are externally driven by one or more cables (i.e., ropes) which transfer forces from a stationary drive system affixed to the load-bearing structure of the containing building/structure. In contrast, our invention would revise the design of the traditional cab, whereas the cab is made to function as an independent self-propelled vehicle. Rather than the externally-driven, cable-based drive system of traditional elevators, our revised cab design may incorporate a tractive drive system which would adhere to the shaft via friction, as disclosed in European Patent EP 0595122 A1, which is incorporated herein for reference.

A tractive drive for a vertical transportation system must rely upon frictional forces developed between the moving cab and the stationary shaft in order to regulate the velocity of the cab as desired. Broadly, friction is a resistance to tangential relative motion between two bodies in contact (i.e., sliding against one another) that is produced by the physical interference of microscopic surface protrusions on the surfaces of both bodies (known as asperities) that deform and/or adhere to one another as the two surfaces are in contact. The exact level of resistance (i.e., force acting in opposition) to the sliding of one body against the other is directly proportional to the normal forces acting to compress the two surfaces together, with the constant of linear proportionality relating the two forces known as the coefficient of friction. There are both kinetic and static coefficients of friction, applicable when the two bodies in contact are/are not sliding against one another (respectively). In order to prevent "slipping" of one body's surface against the other, the net force applied to the bodies in a direction tangent to their contacting surfaces must not exceed the maximum static frictional force possible for that unique combination of surface materials, geometries, and normal forces. The static frictional forces needed to support a cab in a shaft may be produced by pressing a plurality of "tractive drive units" (e.g., wheels, tracks, treads, or other similar devices) (also referred to as tractive drive assemblies) against the walls of the shaft and or other supporting structures anchored to the enclosing building (e.g., guide rails), creating sufficient normal forces and subsequent static frictional forces of magnitudes large enough to fully cancel out the other forces on the cab (e.g., from its weight, acceleration, etc.). The static friction effects may be further enhanced with the application of specialized geometries and/or textures including micro- and/or nano-scale features to a polymer outer surface (e.g., tire tread) of the tractive drive units, which can produce combined van der Waals force and frictional effects, as described in the inventions disclosed in U.S. Pat. Nos. 7,762,362 B2 and 9,908,266 B2, which are both incorporated herein for reference.

The tractive drive technology mentioned above as prior art was never successfully applied due to the impracticality of constructing such a system with the suggested technology and design proposed at the time. This invention leverages advances in power density (i.e., the amount of energy stored or delivered per unit mass) of both battery and electric motor technologies that have only previously been applied in other devices. This invention also overcomes another limitation in conventional elevator technology: translation in a single axis of motion that must be controlled by guide rails/tracks along the full length of the shaft. Our invention is thus able to meet several objectives that are impossible with prior art:

Each cab may operate within a rectangular or cylindrical shaft and, within a cylindrical shaft, may control its angular orientation about an axis of rotation parallel to the axis of vertical translation without the need for guide rails/tracks to be installed within the shaft.

Each cab, if operating within a cylindrical shaft, may intentionally alter its angular orientation about the axis of rotation parallel to the axis of vertical translation in order to align cab doors with shaft doors, which may be placed at any angular orientation about the cylindrical shaft.

Each cab may both ascend and descend within the same shaft, as with traditional elevators, or it may circulate in a designated path with dedicated upward and downward travel shafts linked by "transfer stations" at terminal and/or intermediate points along the shaft that can translate one or more cabs between adjacent shafts.

Multiple cabs may operate independently within the same shaft, thus dramatically increasing the maximal occupancy of each shaft.

Fewer shafts would be required for this proposed system, when compared to existing cabled elevator technology, in order to provide the same level of passenger throughput (persons transported per unit time) for a given building.

DISCLOSURE OF INVENTION

The invention consists of a tractive drive unit that use frictional forces generated by means of controlled compression of one or more drive wheels into the shaft walls directly and/or rails mounted within the shaft, as well as one or more internal driving actuators (e.g., electric motors) and internal energy source(s) to create vertical motion within the shaft and/or hold position. The tractive drive unit operates alone or as part of a set to generate propulsion for self-propelled, autonomous cabs operating within a network of vertical shafts with doors at one or more destination points, constructed so as to be within or otherwise structurally linked to an associated building. These autonomous cabs may operate in shafts of various cross-sectional shapes; for these autonomous cabs operating in shafts of circular cross section, cab angular orientation about the vertical axis of travel may be controlled by means of steering the drive wheel(s) within each tractive drive unit and/or rotation of the passenger compartment. These autonomous cabs may also be transferred between shafts and/or into/out of service by means of one or more electromechanical "transfer stations" at designated points along the length of each shaft.

DETAILED DESCRIPTION

Figure 1:
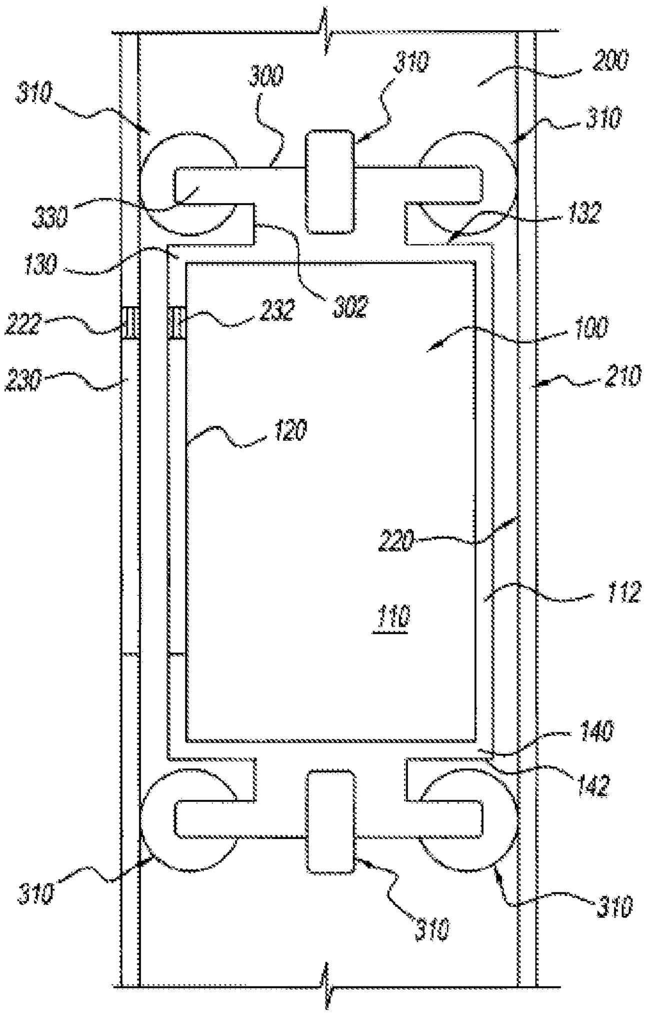
FIG. 1 is a sectional view of a portion of a cylindrical vertical shaft and an elevator cab.

As shown in FIG. 1, an elevator cab 100 is disposed within a cylindrical vertical shaft 200. In one embodiment, the elevator cab 100 has a plurality of tractive drive assemblies 300. The tractive drive assembly 300 comprises one or more drive wheels 310 held within a wheel brace 330. Each wheel 310 is a rotatable member in a torque transmitting relationship with an interior surface 220 of a cylindrical vertical shaft 200.

As shown in FIG. 1, the elevator cab 100 surrounds a passenger or freight compartment 110, as defined by a compartment wall 112. The compartment 110, in one embodiment, further defines a cab door 120. In one embodiment, the cab door 120 may open and close. A shaft door 230 may be disposed in the vertical shaft 200. In one embodiment, the shaft door 230 may open and close. In one embodiment, as shown in FIG. 1, the cab door 120 may be aligned with the shaft door 230 such that when both the cab door 120 and the shaft door 230 are in an open position, a passenger or freight outside the vertical shaft 200 could pass through both the shaft door 230 and the cab door 120 to enter the compartment 110, or a passenger or freight inside the compartment 110 could exit the compartment 110 by passing through both the cab door 120 and the shaft door 230.

In one embodiment, the cab door 120 may align with any one of a plurality of shaft doors 230 disposed at different heights in the vertical shaft 200. In another embodiment, elevator cab 100 may be circumferentially rotated within the vertical shaft 200 such that the cab door 120 may align with any one of a plurality of shaft doors 230 disposed at different points around the vertical shaft 200 circumference.

Figure 2:
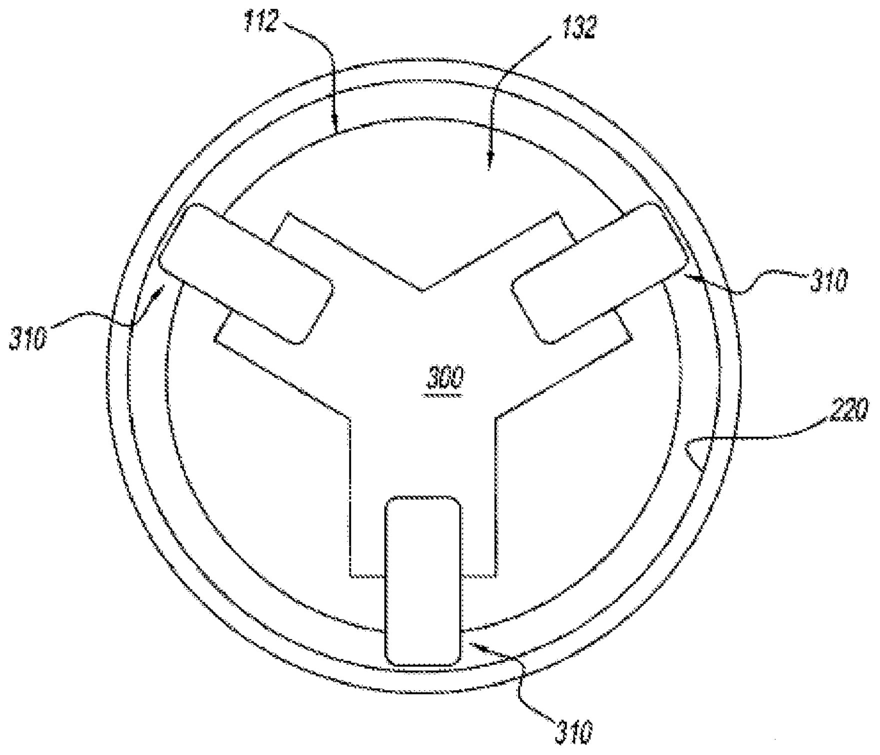
FIG. 2 is an orthogonal top view of the cylindrical vertical shaft and the elevator cab showing contact between the tractive drive units within a tractive drive assembly and the interior surface of the containing cylindrical vertical shaft.

As shown in FIG. 2, in one embodiment, a plurality of drive wheels 310 are arranged in the tractive drive assembly 300 and in a torque transmitting relationship with the interior surface 220. The tractive drive assembly 300, in one embodiment, is fixably attached to an exterior surface 132 of a cab top 130. In another embodiment, a second tractive drive assembly 300 is fixably attached to an exterior surface 142 of a cab bottom 140. In one embodiment, as shown in FIG. 2, there are 3 equally-spaced wheels 310 disposed around the circumference of the elevator cab 100.

In one embodiment, the wheels 310 comprise a set of "drive wheels" that have outer diameters 311 nearly one half that of the internal diameter of the shaft interior surface 220. For example, in a 2 meter (inner diameter) shaft interior surface 220, each drive wheel 310 may have an outer diameter 311 as large as 0.4 meters. As shown in FIG. 1, in one embodiment, the cab 100 is driven by a set of six of these drive wheels 310, divided into two sets of three, mounted at equidistant points around the diameter of the cab in two mirrored tractive drive assemblies 300 fixed to the roof 132 and floor 142 of each cab. In this embodiment, each drive wheel 310 may have an internal gear train 351 that may have a two-stage, static gear ratio.

Figure 7:
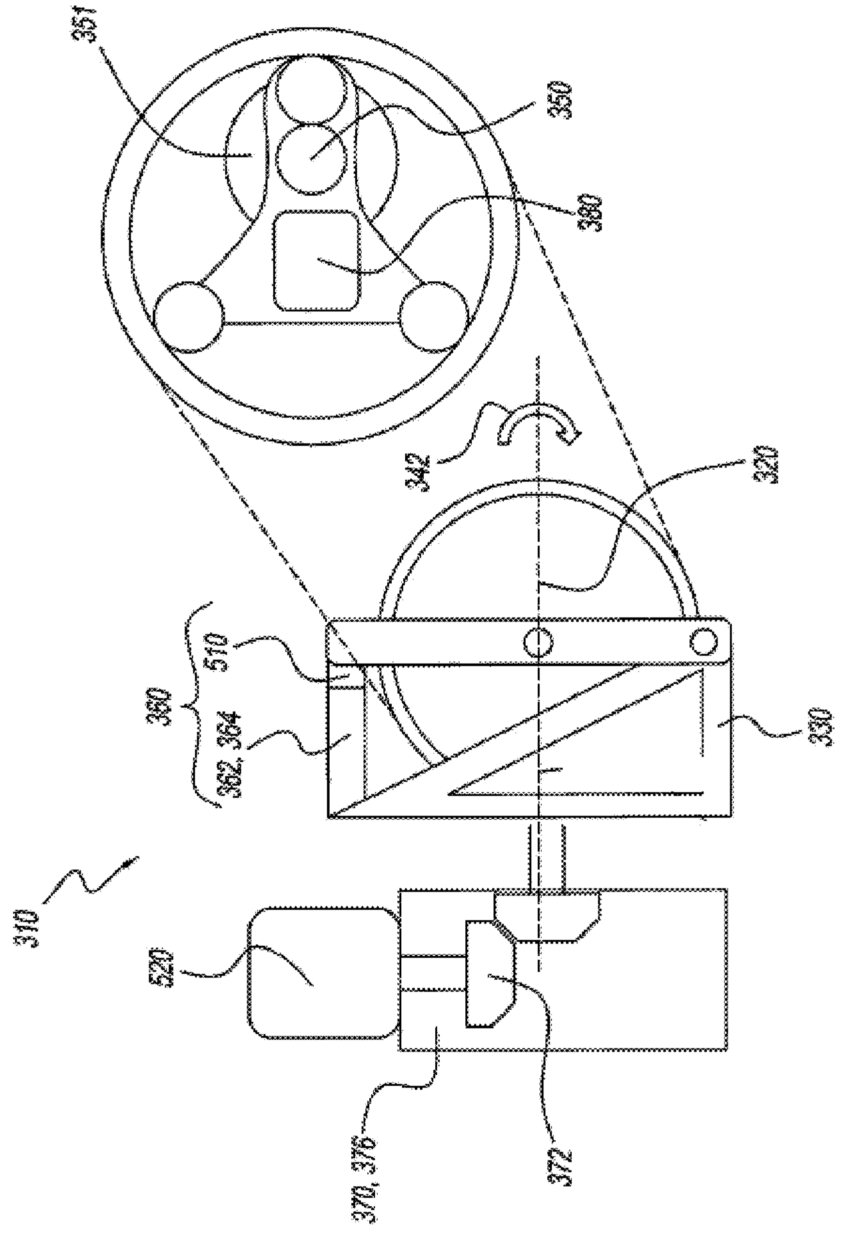
FIG. 7 is a cross-sectional view of a single tractive drive unit and associated portion of the steering mechanism within the tractive drive assembly, as well as an internal inset view of the tractive drive unit.

As shown in FIG. 7, in one embodiment, each drive wheel 310 is drivably connected to an internal drivetrain 350 by means of a central hub 320. The drive train 350 is powered by a drive wheel motor 380. In one embodiment, the drive wheel motor 380 is powered by a cabled connection to an electrical circuit. In another embodiment, the drive wheel motor 380 is powered by wireless transmission through the vertical shaft 200. In one embodiment, the drive wheel motor 380 is controlled wirelessly by a receiver 610 connected to a central operating system 600. In one embodiment the drive wheel motor 380 is a lightweight, alternating current electric motor with a high "power density," here meaning level of sustained mechanical power output per unit mass, on the order of 1,500 W/kg or greater. In one embodiment, the torque transmitted between each drive wheel 310 and the interior surface 220 is at least 1,765 Nm.

Figure 4:
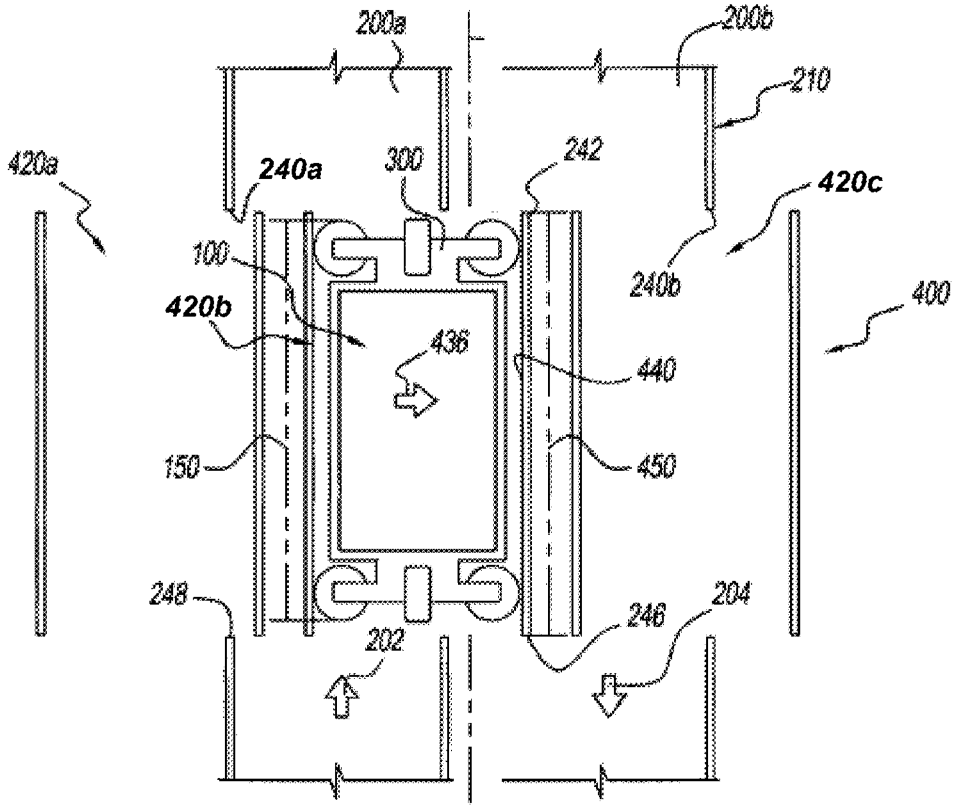
FIG. 4 is a cross-sectional side view of a plurality of cylindrical vertical shafts, the elevator cab, and a transfer station relocating the cab from one cylindrical vertical shaft to another by means of linear translation of a plurality of cradles.
Figure 5:
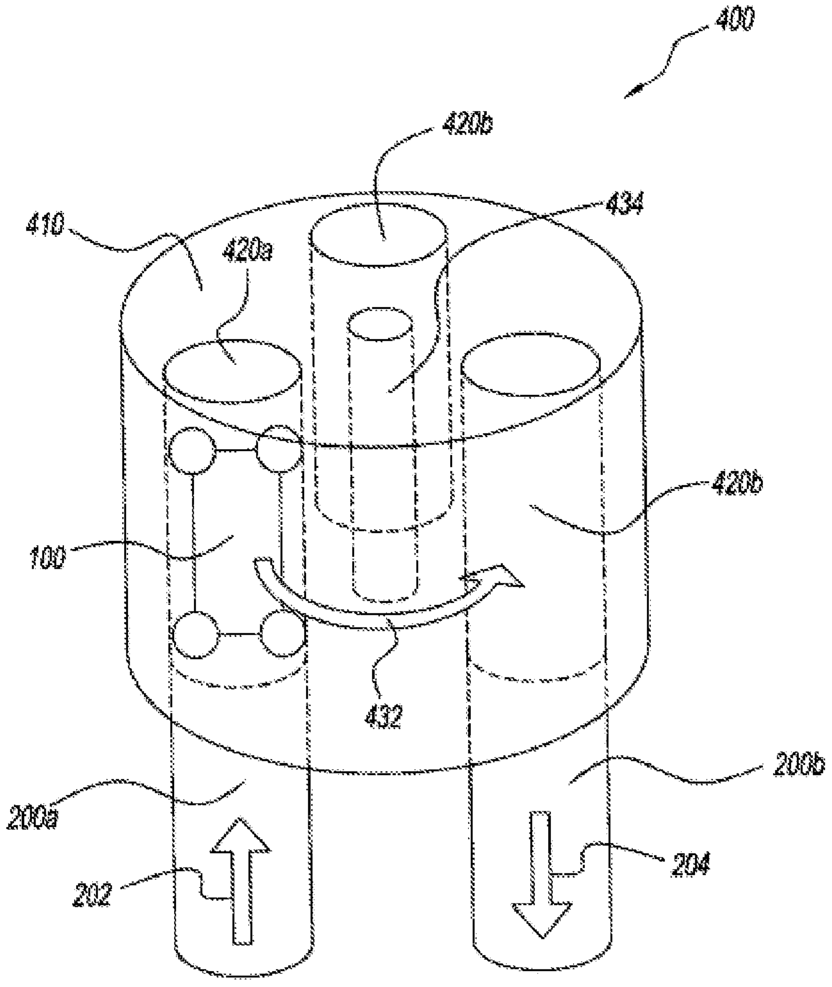
FIG. 5 is an illustration of an alternative embodiment of a transfer station, wherein the cab is relocated by means of a revolving plurality of cradles rotated about a central axis parallel to the cylindrical vertical shafts.

As shown in FIG. 2, each drive wheel 310 will be connected to an independent suspension unit 360 and mounted within a drive wheel brace 330. As shown in FIG. 7, in one embodiment, the drive wheel brace 330 and independent suspension unit 360 compresses the drive wheel 310 into the interior surface 220 in a direction normal to the internal shaft surface and direction of vertical travel by means of a passive single-axis compressive actuator 362 and an active single-axis compressive actuator 364. As shown in FIGS. 4 and 5, in one embodiment, for example, a vertical upward direction 202 can be taken by any cab 100 in a shaft 200*a* while a vertical downward direction 204 can be taken by any cab 100 in a shaft 200*b*. In one embodiment, the passive single-axis compressive actuator 362 is a mechanical spring. In another embodiment the passive single-axis compressive actuator 362 is a sealed pneumatic or hydraulic cylinder. The active single-axis compressive actuator 364 dynamically maintains the default position of and compressive force applied to the drive wheel 310. In one embodiment, the active single-axis compressive actuator 364 is a linear actuator.

As further shown in FIG. 7, the active single-axis compressive active actuator 364 will precisely regulate the nominal compressive force applied each drive wheel 310 whilst the passive single-axis compressive actuator 362 will allow some deflection in the event of discontinuities or shocks and smooth the vertical motion, improving ride quality. The exact compressive force applied to each drive wheel 310 will be measured in real time by means of instrumentation such as, in one embodiment, a plurality of load cells 510 mounted along the compressive axis of the independent suspension unit 360, whose data will then be fed to an onboard electronic control system 500 than can adjust the active single axis compressive actuator 364 of each independent suspension unit 360 in order to increase or decrease the nominal compressive load and/or normal force and resulting frictional forces on each drive wheel.

Figure 6A:
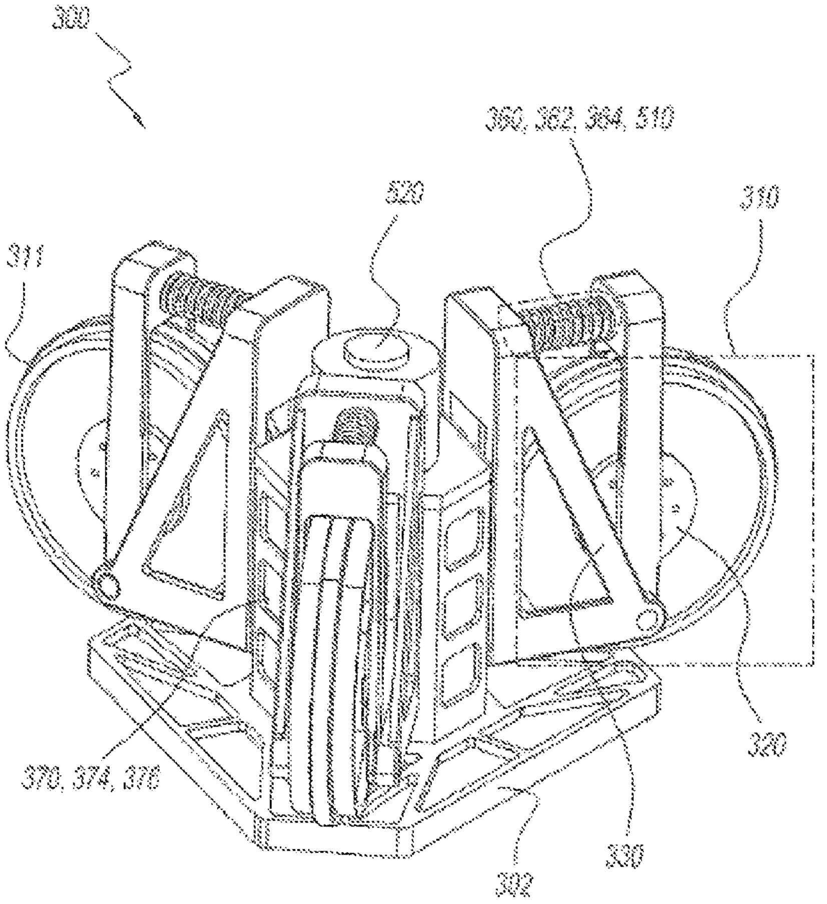
FIG. 6*a*. is an isometric view of the tractive drive assembly.
Figure 6B:
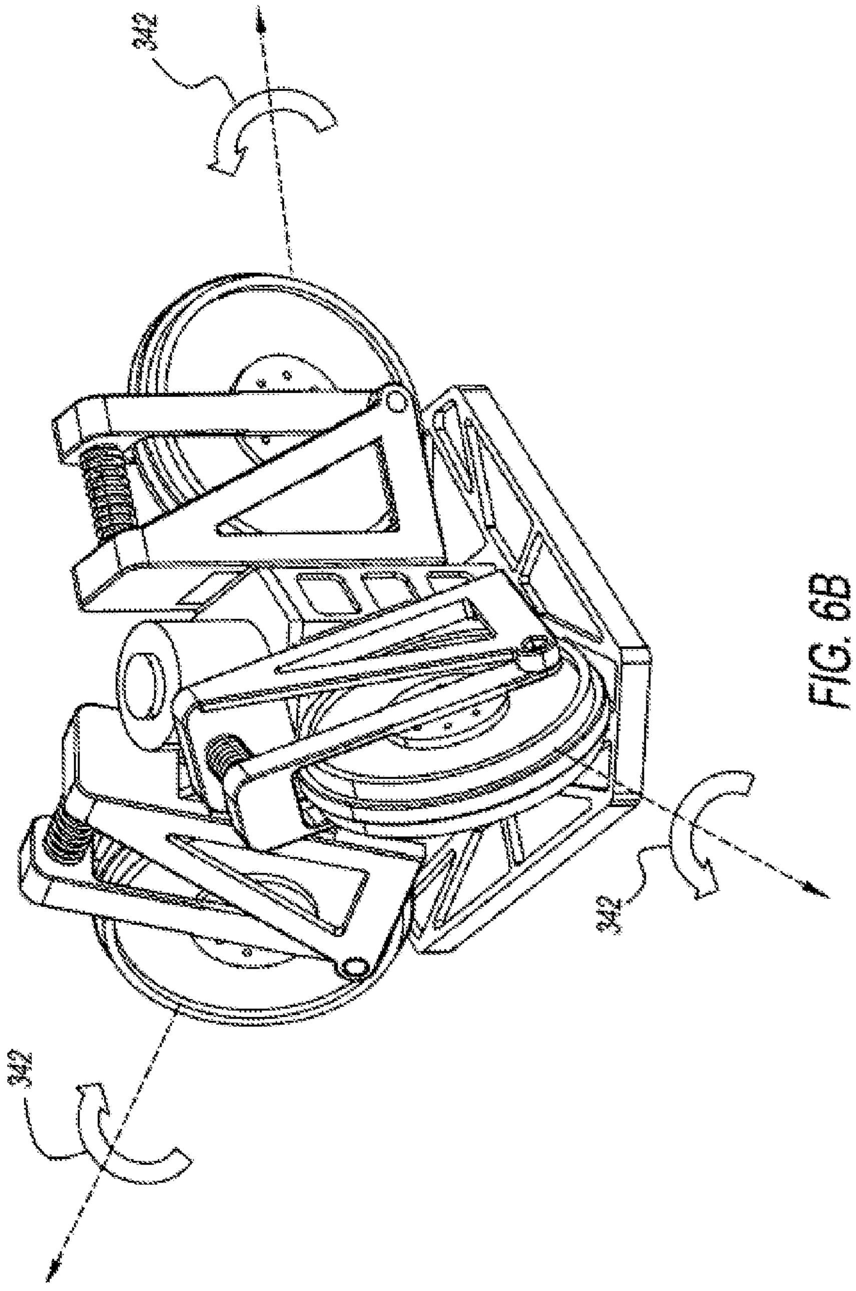
FIG. 6*b* is an isometric view of the tractive drive assembly showing the tractive drive units rotated about an axis of steering to induce rotation of the cab along with vertical motion.

As shown in FIG. 6*b*, each drive wheel brace 330 may be able to rotate about the axis of applied normal force in order to steer each drive wheel 310, on the order of ±15° from vertical, and produce a net rotation of the cab 100 about the vertical axis of travel within the shaft 200. The steering angle 342 of each drive wheel brace 330 in a tractive drive assembly 300 would be coupled by means of a centralized transmission unit 370.

In one embodiment, the centralized transmission unit 370 incorporates one beveled output gear to each drive wheel brace 330 driven by a central steering pinion 372 rotating about the axis of vertical travel with torque supplied by an electric steering motor 520. In another embodiment, the electric steering motor 520 may be coupled to the central steering pinion 372 by means of a driving worm gear 374. In another embodiment, the centralized transmission unit 370 includes a central steering gear box 376 coupled to the electric steering motor 520 and drive wheel braces 330. The centralized transmission unit 370 may be in communication with the central operating system 600 in order to ensure synchronous steering orientation of all drive wheels 310 as the cab is made to rotate. This steering mechanism allows the cab 100 to align the cab door 120 with passenger access doors 230 positioned at nearly any location around the circumference of the shaft.

Each cab 100 may also use dynamic braking to both control descent and recapture some of the kinetic energy of the cab 100 into potential energy stored within an onboard energy reservoir such as, for example, batteries, ultracapacitors, and/or other similar devices), that would then be used to augment the energy required for the cab's 100 ascent. Due to the rapid delivery/removal of energy required for each cab, in one embodiment of this energy storage/delivery system would consist of ultracapacitors to deliver or absorb short-duration power bursts, paired with lithium polymer batteries for larger energy storage that is slower to charge/discharge.

Figure 3:
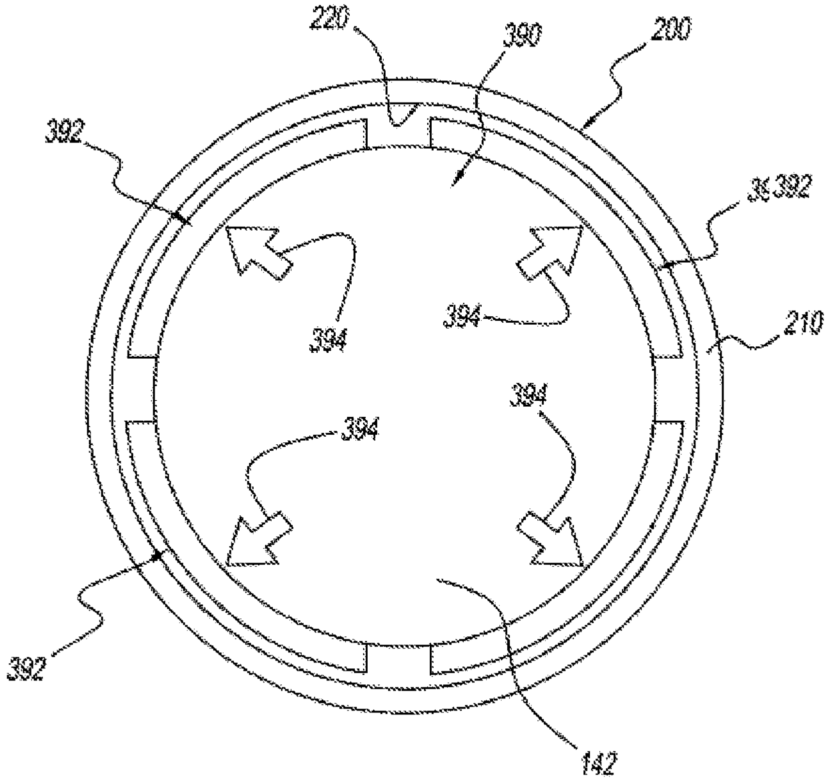
FIG. 3 is an orthogonal top view of one embodiment of the cylindrical vertical shaft and the elevator cab showing an array of brake system components.

As shown in FIG. 3, an array of emergency brake shoes 392 may be arranged, in one embodiment, in a circumferential array, serving as an emergency braking system 390. Each cab 100 may incorporate the emergency braking system 390 that would activate in the event of a tractive drive system failure (wherein the cab loses partial/full traction with the shaft in a manner unable to be compensated for with independent suspension unit adjustments) or loss of power. When initiated, the emergency braking system 390 would push a plurality of brake shoes 392 from within the cab 100 in an outward direction 394 against the interior surface of the shaft 220 and the ensuing friction would slow, and eventually stop the cab 100 from descending.

As shown in FIG. 4, one or more transfer stations 400 connect a plurality of shafts 200. In one embodiment, the transfer station 400 connects two shafts 200 at an intermediate level. In another embodiment, the transfer station 400 connects two shafts 200 at a terminal end thereof. In one embodiment, the transfer station 400 comprises electromechanical assemblies that contain a transpositioning system 410 capable of translating a cradle 420, comprising a discontinuous segment of the shaft 200 large enough to carry a single cab, at a minimum, between two adjacent shafts 200*a* and 200*b*. In one embodiment, the cradle 420 is contiguous with the shaft wall 210. In addition to transferring cabs between adjacent shafts, transfer stations 400 may also add or remove cabs 100 from service for maintenance and/or storage, both of which would likely be located at the base of the shaft network of each elevator system.

In one embodiment, as shown in FIG. 4, the transpositioning system 410 is a rail or track system. In another embodiment, the transpositioning system 410 is a roller system. In another embodiment, the transpositioning system 410 is a belt-driven system. In another embodiment, the transpositioning system 410 is a chain-driven system. In one embodiment, the transpositioning system 410 executes linear translation, that is, perpendicular to the vertical axis of travel of the cab 100.

As further shown in FIG. 4, in one embodiment, the transpositioning system 410 provides a linear force in a direction 436 on the cradle 420, which has an upper cradle end 242 and a lower cradle end 246. In one embodiment, the cab 100 is aligned with the upper cradle end 242 and lower cradle end 246 such that the entire compartment wall 112 and the tractive drive assembly 300 are contiguous within the cradle 420 and an interior cradle wall surface 440. The cradle 420 is sized so that a cradle height 450 exceeds a total cab height 150 by at least 3 inches, such that the entirety of the cab 100 and each of the tractive drive components 300 are fully enclosed in the cradle 420. Each of the drive wheels 310 exert enough force on the interior cradle wall surface 440 to hold the cab 100 static in position fully enclosed in the cradle 420.

In one embodiment, the static shaft 200 has a static wall lower edge 240. When the cab 100 is in motion within the static shaft 200, the static wall lower end 240 and the upper cradle end 242 are seamlessly tessellated. In this embodiment, the lower cradle end 246 is seamlessly tessellated with a static wall upper end 248, such that the drive wheels 310 may smoothly roll across the interior shaft wall surface 220 and the interior cradle wall surface 440.

As further shown in FIG. 4, the transpositioning system 410 causes the cradle 420*b*, in which is disposed the cab 100, to laterally move, separating from vertical shaft 200*a* and becoming aligned with vertical shaft 200*b*. When the occupied cradle 420*b* is aligned with a shaft 200*b*, the cab 100 may smoothly travel by means of its tractive drive 300. In this way, a cab 100 may be removed from one cylindrical vertical shaft 200 to another, or to a holding cradle, without disrupting the path of travel along the interior shaft wall surface 220 of any other cab 100 that may be disposed in a cylindrical vertical shaft 200. As shown in FIG. 4, in one embodiment, a second occupied or empty cradle 420*b* is also transposed by the transpositioning system 410 to seamlessly tessellate with shaft 200*a* such that another cab, not shown, may travel through the transfer station 400.

In one embodiment, as shown in FIG. 5, a cradle 420*a* disengages from a first static shaft 200*a* and travels revolvably in direction of cradle rotation 432 about the axis of the revolving transpositioning system 434, carrying the cab 100 towards a second static shaft 200*b*. As shown in FIG. 5, the direction of cradle rotation 432 is counterclockwise. In another embodiment, the direction of cradle rotation 432 is clockwise. In this embodiment, the cab 100 inclusive of any tractive drive assembly 300 is fully disposed within the cradle 420 between the upper cradle end 242 and the lower cradle end 246.

As shown in FIG. 5, in another embodiment, the transpositioning system 410 executes a rotational motion, akin to the rotating chambers in a revolver magazine. The transfer station 400 replaces the removed occupied cradle 420*a* with another cradle 420*b*, which may be occupied or empty. Once the translated cradles 420 are aligned with the rest of each shaft 200, any stored cab(s) 100 may exit and continue motion within the adjacent shaft 200.

In one embodiment, the transpositioning system 410 can open such that a cab 100 can be placed at rest outside of alignment of any vertical shaft 200. In one embodiment, the cab 100 may be removed or accessed by a user for maintenance, storage, repair, or replacement.

As shown in FIG. 6*a*, in one embodiment, the tractive drive assembly 300 has three drive wheels 310 fixed to equidistant triangular points around the tractive drive assembly 300, each secured within a drive wheel brace 330. In one embodiment, a basal platform 302 secures the tractive drive assembly 300 to the cab top 130.

Because a plurality of cabs 100 may travel within the same shaft 200, in one embodiment, one shaft 200*a* would be allocated to upward-traveling cabs 100 and another shaft 200*b* downward-traveling cabs 100. The operating system 600 processes a plurality of inputs to determine optimal allocation of cabs 100 to each directional shaft 200, such as, for example, upward-traveling or downward-traveling. In one embodiment, anticipated user activity at a given time of day will inform that more shafts would be allocated to upward traveling cabs during peak up-demand periods (e.g., beginning of the workday) and more shafts to cabs traveling downward during peak down-demand periods (e.g., end of the work day), thereby optimizing the overall system's vertical transport efficiency of the elevator system.

Figure 8:
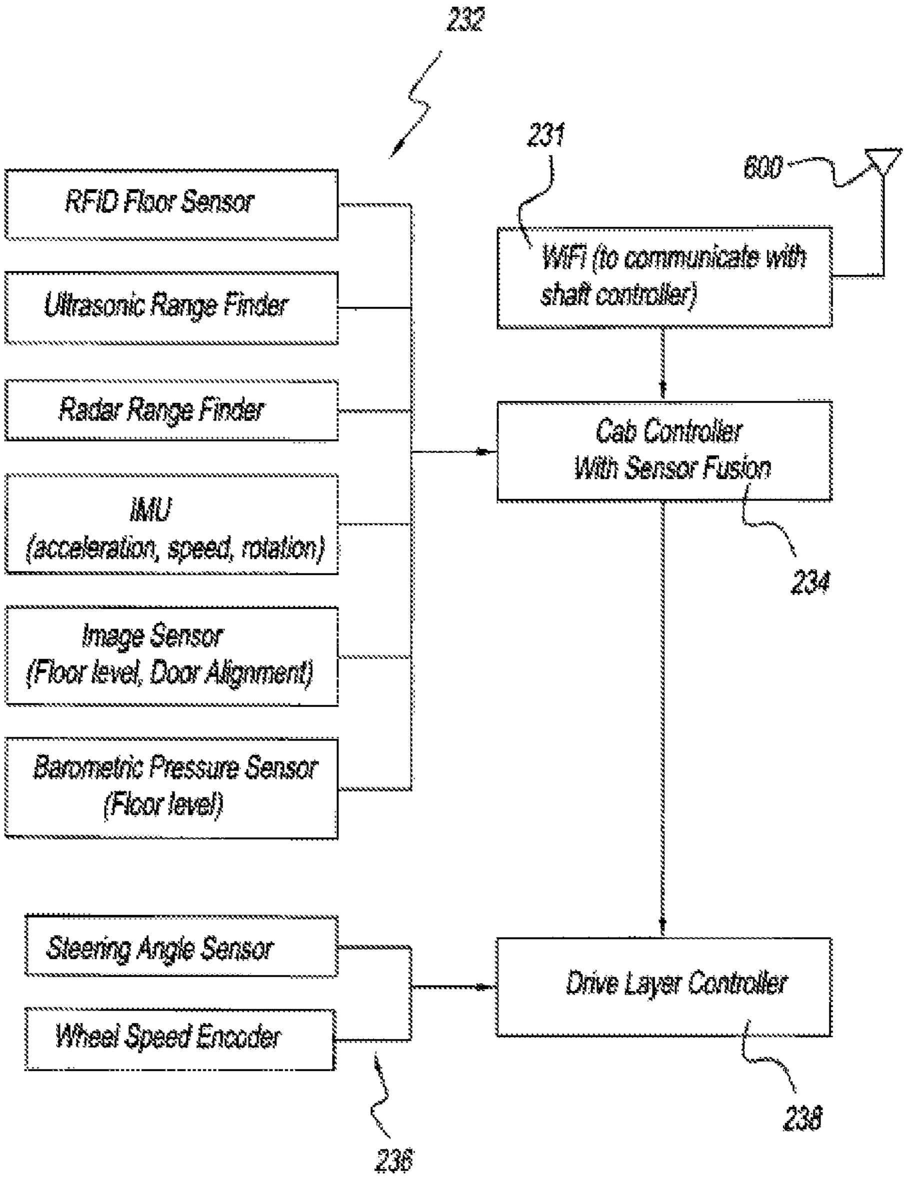
FIG. 8 is a schematic view of a sensor array operating within each cab.

Optimized cab traffic scheduling and/or destination dispatch may be accomplished with the operating system 600 that, in one embodiment, includes an artificially intelligent operating system in dynamic communication with a plurality of cabs 100 via a private secured wireless network 630. In another embodiment, the operating system 600 is controlled by a central processing unit. As shown in FIG. 1, one or more shaft sensors 222 are disposed proximate to any shaft door 230 and are in communication with the operating system 600. Each cab 100 further has one or more sensors 232 in communication with the operating system 600 via a cab controller module 234. As shown in FIG. 8, in one embodiment, the shaft sensors 222 are in communication with a shaft (or supervisory) controller 231, which may also communicate with and send commands to any transfer stations associated with a set of cabs and shafts.

As shown in FIG. 8, in one embodiment, the sensors 232 comprise RFID sensors that determine where the cab 100 is along the shaft 200, inertial measurement units that measure speed, rotation, and acceleration of the cab 100, and imaging sensors that measure alignment with the doors 230. The cab sensors 232 are in communication with a cab controller 234. As further shown in FIG. 8, in one embodiment, there is a tractive drive controller 238 in communication with the cab controller 234. The tractive drive controller 238 is in communication with a plurality of drive sensors 236. In one embodiment, as shown in FIG. 8, the drive sensors 236 comprise steering angle sensors that detect the degree to which the wheels 310 may be rotated, speed encoders that detect motion of the wheels 310, one or more load cells 510 that detect the load borne by the independent suspension units 360, temperature sensors, voltage sensors, and current sensors.

The operating system is in communication with this plurality of sensors and control algorithms that use the sensor inputs to measure and control the speed, position, and rotation of the cab to facilitate alignment with floor level door openings that vary from floor to floor. Rotational sensors may include accelerometers, gyroscopes and magnetometers, combined within an inertial measurement unit, and provide the precise rotational position of the cab. A steering angle sensor and a wheel speed encoder for each drive wheel 310 may be used in a closed loop control algorithm to position the cab in the correct rotational position. Image sensors can provide further alignment accuracy. The sensors may include radar and ultrasonic ranging sensors that measure the distance to another cab that is above or below the cab. In one embodiment, a barometric sensor measures the absolute altitude to determine the height above ground level to determine the corresponding building floor level. Additionally, optical sensors detect the floor level by reading QR codes applied to the shaft wall, where each QR code is associated with a specific floor level. In another embodiment, Radio Frequency Identification sensors are used to further determine the cab's present floor location. In another embodiment, each of these sensors are combined using sensor fusion to increase the position accuracy of the cab.

In another embodiment, the operating system 600 is decentralized, with software and processing distributed amongst multiple cabs 100 within the network, all connected by means of a secure wireless cab-to-cab mesh network or similar local private wireless communication network topology.

In another embodiment, the operating system 600 is also in communication with passengers via their mobile devices. In one embodiment, passengers may communicate with the elevator system, such as for example to hail an elevator cab 100, using installed consoles at each door 230. In another embodiment, passengers may communicate with the elevator system via a mobile device 650. In another embodiment, the mobile device 650 device may join a wireless communications network 630 by communicating with a receiver 610. In another embodiment, the mobile device 650 is in communication with the operating system 600 by means of encrypted communications through the public internet.

It is understood that in other embodiments of the present invention the arrangement of drive wheels 310 may be any combination of the types described above. It is understood that in other embodiments of the present invention, the cab 100 may be composed of any combination of materials. It is understood that in other embodiments of the present invention any number or type of cab sensors 232 and/or drive sensors 236 may be used. It is understood that in other embodiments of the present invention, the power sources for any of the tractive drive system 300, the transpositioning system 410, and/or the shaft doors 230 and cab doors 120 may be wired, wireless, battery powered, or otherwise powered by any reasonable means. It is understood that in other embodiments of the present invention shafts may run in directions other than vertical. It is understood that in other embodiments of the present invention shafts and/or cabs may be of shapes other than cylindrical.

Figure 9:
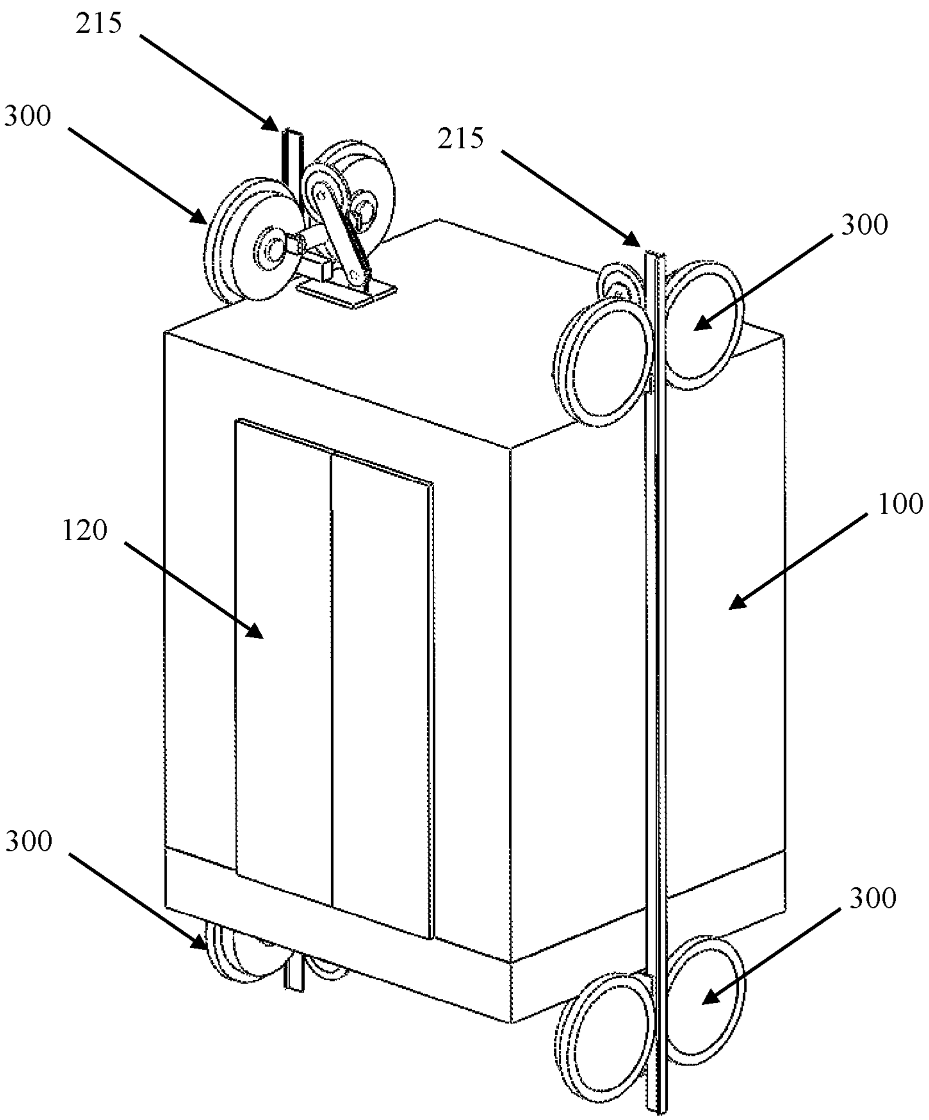
FIG. 9 is an isometric view of an elevator cab of rectangular cross section

FIG. 9 depicts an isometric view of a single elevator cab 100 according to an exemplary embodiment. This elevator cab 100 is shown for illustrative purposes to assist in disclosing various possible embodiments of the invention. As is understood by a person skilled in the art, FIG. 9 does not depict all of the components of an exemplary elevator cab, nor are the depicted features necessarily included in all elevator cabs. As shown in FIG. 9, the elevator cab 100 has a rectangular cross-section and travels between two rails 215 mounted to the shaft walls perpendicular to those where cab passenger doors 120 are placed. The elevator cab 100 is propelled by four tractive drive units 300 that allow for vertical travel, holding position, and maintaining proper alignment of the elevator cab 100 with respect to all axes of translation and rotation during operation.

Figure 10:
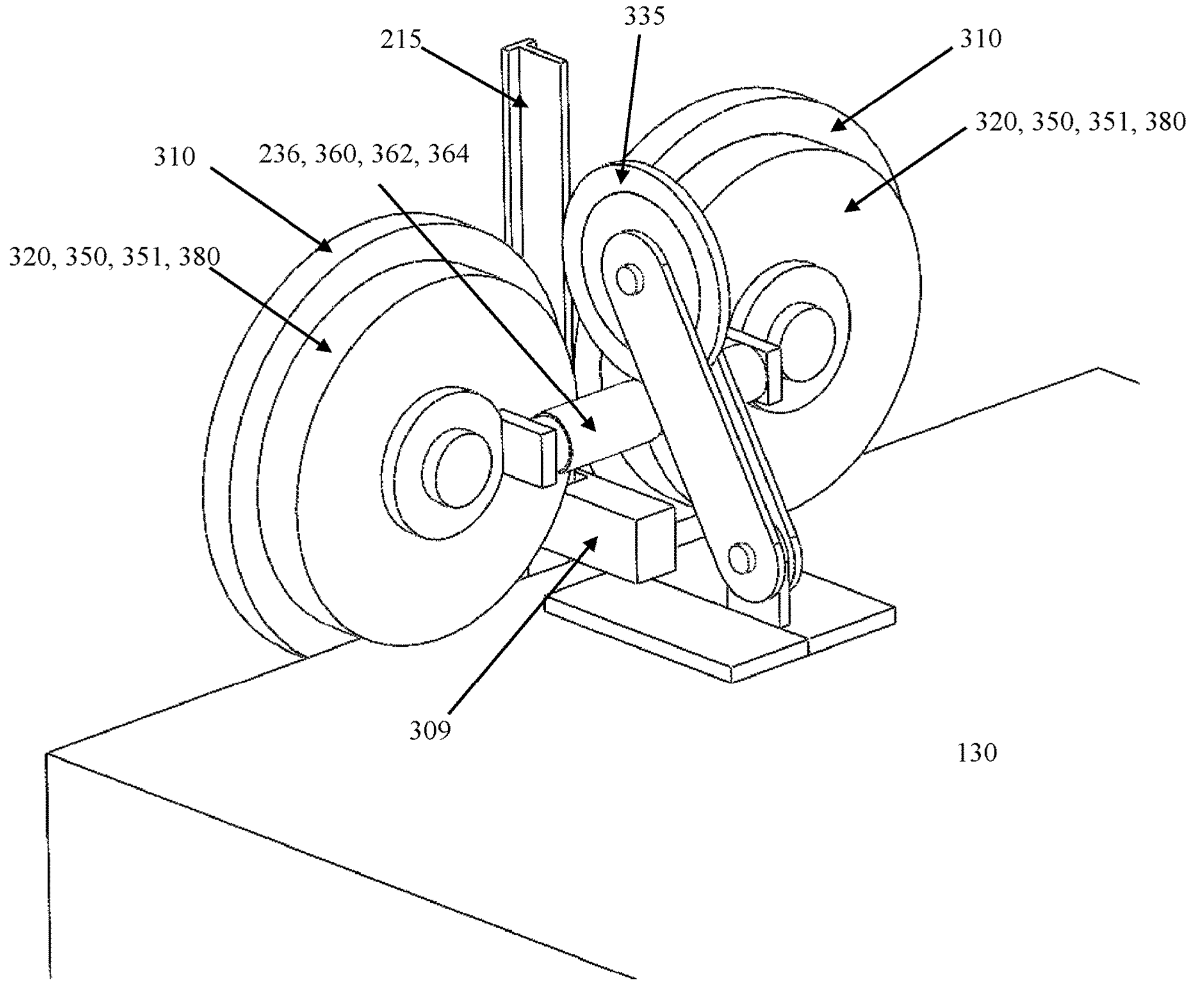
FIG. 10 is an isometric view of a tractive drive unit in an alternative embodiment as mounted on top of an elevator cab of rectangular cross section.

FIG. 10 depicts an isometric view of a single tractive drive unit according to an exemplary embodiment. This tractive drive unit is shown for illustrative purposes to assist in disclosing various possible embodiments of the invention. As is understood by a person skilled in the art, FIG. 10 does not depict all of the components of an exemplary tractive drive unit, nor are the depicted features necessarily included in all tractive drive units. The tractive drive unit, here mounted to the top of the cab 130 comprises two drive wheels 310 which are compressed together against a shaft-mounted rail 215. Each drive wheel 310 is driven by a central hub 320 which contains a single electric drive motor 380 and any associated drivetrain 350 or gear train 351. The drive wheels 310 and central hubs 320 are pulled together in compression with the shaft-mounted rail 215 by means of the independent suspension unit 360, which may contain both passive (e.g., a coiled spring) 362 and active 364 (e.g., a linear actuator) force-generating elements arranged in series with one another and set to generate a regulated compression force (monitored by internal instrumentation 236) for the purpose of creating the required frictional force interaction between the interfacing drive wheel 310 and shaft-mounted rail 215 surfaces. An unpowered guide roller 335 is mounted perpendicular to the direction of rotation of the two drive wheels 310 and rolls in contact with the shaft-mounted rail 215 with a set position in order to ensure proper orientation of the elevator cab 100 along with the drive wheels 310 during operation. A rail brake 309 is positioned such that the guide rail 215 passes between it, remaining open/not in contact with the guide rail 215 during normal operation, but clamping/engaging with the guide rail 215 in order to cease motion in the event of parking, loss of traction, or other emergency/error condition.

Figure 11:
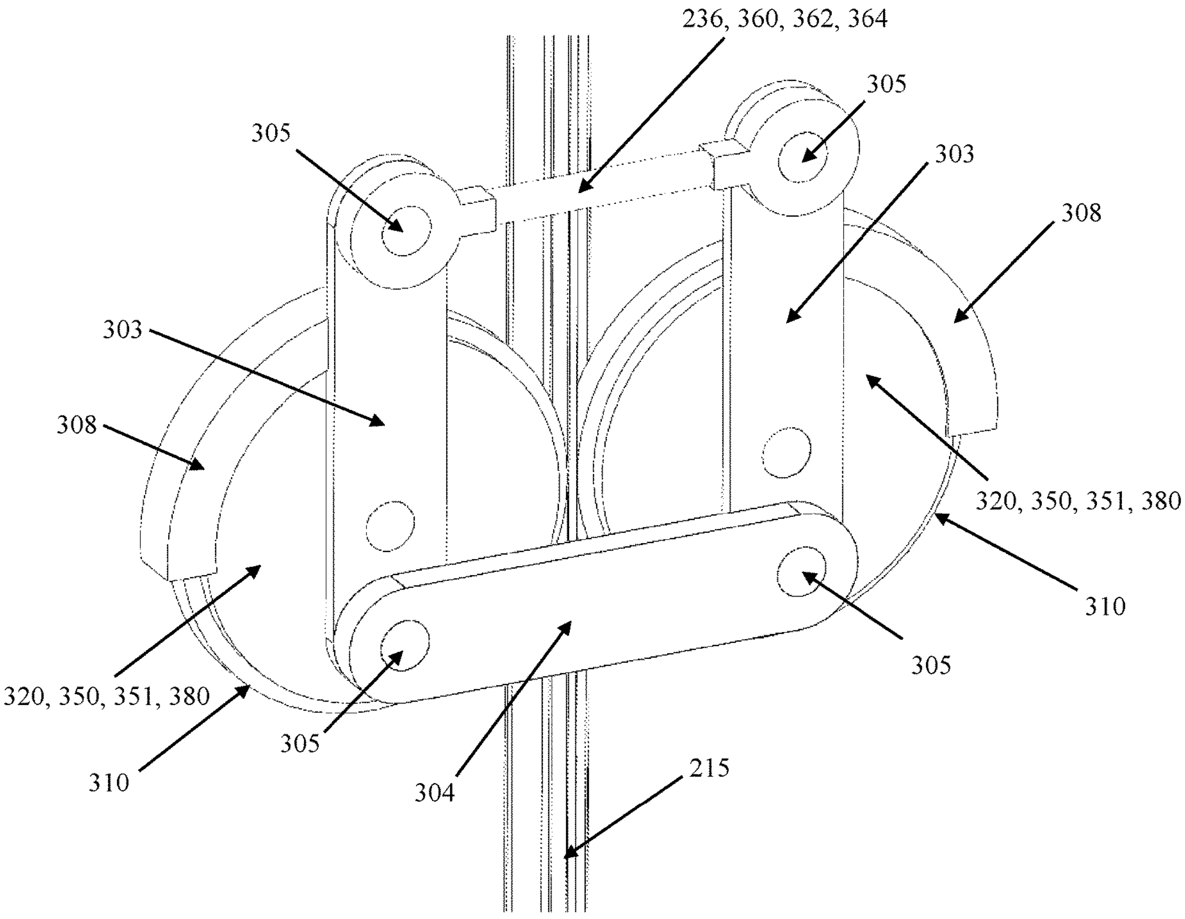
FIG. 11 is an isometric view of a tractive drive unit in an alternative embodiment.

FIG. 11 depicts an isometric view of a single tractive unit according to an exemplary embodiment. This tractive drive unit is shown for illustrative purposes to assist in disclosing various possible embodiments of the invention. As is understood by a person skilled in the art, FIG. 11 does not depict all of the components of an exemplary tractive drive assembly, nor are the depicted features necessarily included in all tractive drive assemblies. The tractive drive unit consists of two drive wheels 310 which are compressed together against a shaft-mounted rail 215. Each drive wheel 310 is driven by a central hub 320 which contains a single electric drive motor 380 and any associated drivetrain 350 or gear train 351. The drive wheels 310 and central hubs 320 are pulled together in compression with the shaft-mounted rail 215 by means of the independent suspension unit 360, which may contain both passive (e.g., a coiled spring) 362 and active 364 (e.g., a linear actuator) force-generating elements arranged in series with one another and set to generate a regulated compression force (monitored by internal instrumentation 236) for the purpose of creating the required frictional force interaction between the interfacing drive wheel 310 and shaft-mounted rail 215 surfaces. The drive wheels 310 and independent suspension unit 360 are mounted to vertical links 303 and a horizontal link 304 by means of rotational/pin joints 305 such that the axes along which forces normal to the shaft-mounted rail 215 operate are offset from one another in order to implement a lever effect. A caliper brake 308 is mounted to each vertical link 303 and/or central hub 320 such that a portion of each drive wheel 310 passes through it, remaining open/not in contact with the drive wheel 310 during normal operation, but clamping/engaging with the drive wheel 310 in order to cease motion in the event of parking, loss of traction, or other emergency/error condition.

Figure 12:
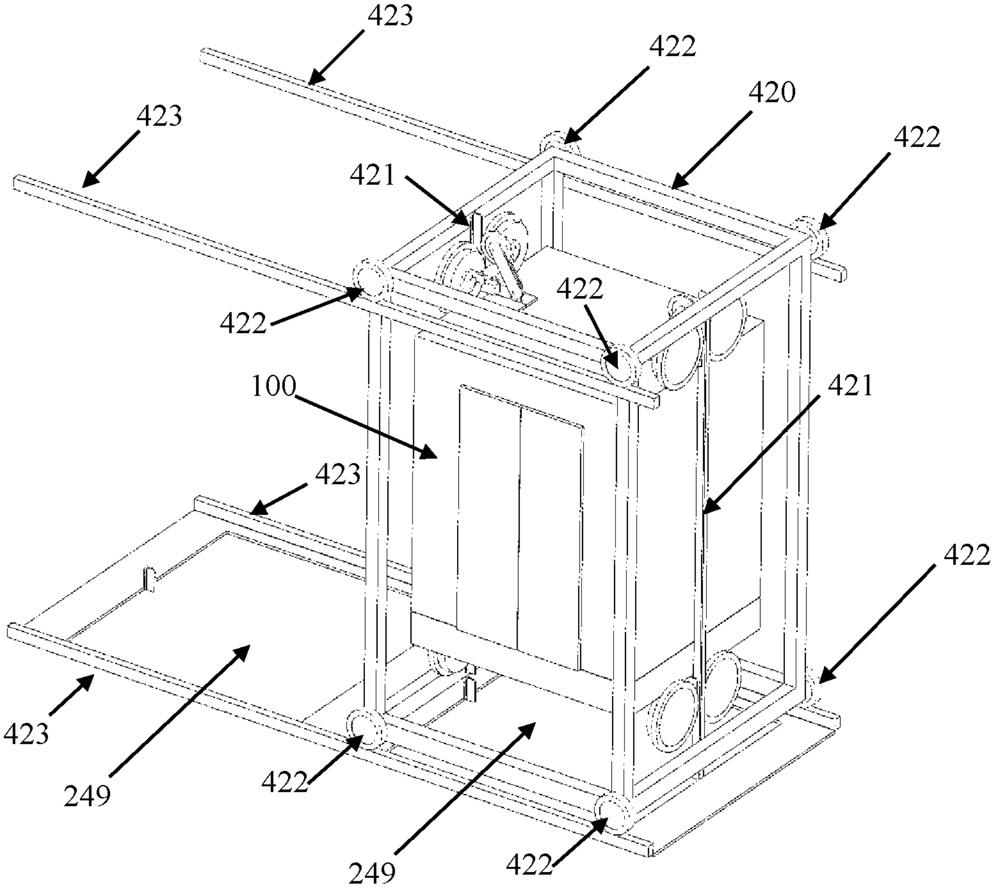
FIG. 12 is an isometric view of a transfer station in an alternative embodiment.

FIG. 12 depicts an isometric view of a single transfer station capable of linear translation (i.e., a "lateral transfer station") according to an exemplary embodiment. This lateral transfer station is shown for illustrative purposes to assist in disclosing various possible embodiments of the invention. As is understood by a person skilled in the art, FIG. 12 does not depict all of the components of an exemplary lateral transfer station, nor are the depicted features necessarily included in all lateral transfer stations. The lateral transfer station contains a rigid cage-like structure known as a cradle 420, which has two rail segments 421 mounted vertically to two opposing interior walls of the cradle 420 and an interior volume which may be occupied by a single cab 100. The cradle 420 includes a plurality of cradle guide rollers 422, each of which is in contact with a lateral transfer track 423, allowing the cradle 420 to translate laterally from the one shaft opening 249 to a second shaft opening 249 at the other end of the lateral transfer tracks 423. The cradle 420 or cradle guide rollers 422 may be driven in lateral motion by means of an external drive (e.g., electric motor anchored within the enclosing building connected by means of a belt, chain, and/or rack-and-pinion to the cradle) or by one or more motors mounted within the cradle 420 itself and connected to the cradle guide rollers 422 to produce locomotion, with exact kinematics controlled by means of an internal electronic control system and instrumentation mounted on the cradle 420 and/or in proximity to the lateral transfer tracks 423.

Embodiments for Carrying Out Invention

The optimal embodiment for the tractive drive unit(s) of the cabs for the invention is likely to be a set of large-diameter "drive wheels" that have outer diameters nearly one half that of the internal diameter of a circular enclosing shaft or one half the corresponding wall depth of a rectangular shaft. For example, in a 2 meter (inner diameter) circular shaft, each drive wheel may have an outer diameter as large as 0.4 meters. Each cab would be driven by a set of these drive wheels. For example, in a circular shaft, the drive wheels may be divided into two sets of three mounted at equidistant points around the circumference of the cab in two mirrored tractive drive units at the top/bottom of each cab; in a rectangular shaft, the drive wheels may be mounted in four tractive drive units placed at each corner of the midplane of the cab. Regardless of embodiment and configuration, each drive wheel would be powered by a lightweight, alternating current electric motor, which may be direct-drive or packaged with any required gearing within the body of each drive wheel. This structure is only feasible by utilizing modern electric motors with a minimum "power density", here meaning level of sustained mechanical power output per unit mass, on the order of 1,500 W/kg or greater.

Each drive wheel would be mounted within an independent "adaptive suspension" attached to an articulating structure and/or an opposing drive wheel (in the case of a rectangular shaft and a cab interfacing with shaft-mounted rails), which would compress the drive wheel into the shaft wall or shaft-mounted rail (normal to the internal shaft/rail surface and direction of vertical travel) by means of a "passive" single-axis actuator (e.g., mechanical spring or sealed pneumatic cylinder) paired with an "active" actuator (e.g., linear actuator) that would set and maintain the default position of (and compressive force applied to) each drive wheel. Working together, the active actuator would be used to adjust the nominal compressive force applied to each drive wheel whilst the passive actuator would allow some deflection in the event of discontinuities/shocks and smooth the vertical motion, thus improving ride quality.

The combination of drive motor torque and compression force(s) applied at each wheel-shaft or wheel-rail interface in order to produce the desired cab kinematics at any point in time for a given mass/weight of cab and payload would be controlled via a closed-loop electronic control system. When a cab in a stopped/parked at a particular stop or floor and any passenger operations (ingress/egress) have completed, the weight (gravitational force) of the payload and/or cab structure would be measured by instrumentation (e.g., load cells) mounted within the frame of the cab (e.g., attachment points for tractive drive units and/or underneath the platform supporting any payload). The measured value for the cab and payload weight would be read and stored by a "cab controller", which would consist of one or more processor(s), computer-readable memory, and one or more communication circuit(s), with the computer readable memory storing one or more programs or computer instructions pertaining to desired cab behavior; physically, these components and contained software (program and/or instructions) may be packaged into a single printed circuit board and enclosure or distributed amongst several discrete devices within the cab. Also while the cab is in a parked position, the cab controller would determine the next desired destination for the cab, based upon any commands received by the communication circuit(s) or existing travel routes already in progress (e.g., for passengers still onboard who have yet to be delivered to their desired destinations); the cab controller would then calculate the required movement profile (set of functions including some combination of jerk, acceleration, velocity, and displacement versus time) to travel to the next stopped/parked position based upon set movement profile construction rules stored in its onboard software and memory. When "in motion" (i.e., when not transitioning into/out of or assuming a stopped/parked position, further described below), the cab controller will compare both the measured weight value and desired movement profile to a known calibration function/data set outputting the corresponding required drive motor torque and adaptive suspension compressive force to achieve the desired movement profile. The cab controller will then activate the drive motors (e.g., via digital signals sent to a motor driver or inverter regulating the electrical voltage and current delivered to the drive motors) and adaptive suspension active actuator (e.g., via digital signals sent to a motor driver or inverter regulating electrical current to an electric motor) to produce the required levels of torque and force, respectively, in order to follow the movement profile; closed-loop control of the torque and force values would be achieved by feeding signals from instrumentation within the cab and/or tractive drive unit to measure relevant physical parameters (including drive motor voltage, drive motor current, drive motor torque, active actuator force, and/or active actuator strain) and having the controller adjust its command signals until the drive motors and adaptive suspension produce the desired output values. If the drive motor output torque and adaptive suspension compression force values are within an ideal range for the desired movement profile, the cab controller would next measure the actual movement profile of the cab via additional instrumentation mounted within the cab and/or each tractive drive unit. This instrumentation may also vary in configuration and data recorded: an inertial measurement unit could record acceleration values, which could then be used to calculate instantaneous jerk, velocity, and displacement; rotational encoders on each drive wheel or shaft could record angular displacements, which could then be used to calculate instantaneous displacement, velocity, acceleration, and jerk; a sonic/light range finding sensor could directly determine linear displacement, which could then be used to calculate instantaneous displacement, velocity, acceleration, and jerk. If the data from instrumentation met the desired motion profile for a given point in time, the cab controller would continue to adjust the drive motor torque and adaptive suspension compressive force to be within values reported by the known calibration function/data set for any point in time along the desired motion profile. If an unexpected deviation from the desired motion profile is detected via the instrumentation, the cab controller may adjust the drive motor torque and/or adaptive suspension compressive force. For example, if kinematic parameter values (i.e., acceleration, jerk, velocity, displacement) exceed desired values (e.g., an overspeed condition), the cab controller may command a reduction to all drive motor torque output and/or engage one or more modes of braking. If kinematic values are below desired values, the cab controller may first command an increase in all drive motor torque output; if increasing drive motor output torque does not restore desired motion profile, the cab may be experiencing a loss of traction, so the cab controller would command an increase in compressive force between one or more drive wheels and its/their interfacing shaft or rail(s) in order to increase the maximum limit of static friction, thus increasing the relative maximum possible tractive force from the affected drive wheels; if both corrective actions fail, the cab controller may engage one or more braking systems.

When each cab is in a parked/stopped position (e.g., during passenger ingress/egress), the secondary braking system or another "parking brake" mechanism would be engaged with the shaft wall and/or shaft-mounted rails and the electric motor(s) within each tractive drive unit would be partially/wholly de-energized. In order to initiate motion, each tractive drive unit would execute a "start-up" set of operations, starting with energizing of the tractive drive unit motor(s) in order to reach a holding (i.e., stall) torque sufficient enough to deliver the exact amount of tractive force to the shaft wall and/or shaft-mounted rail(s) interfacing with each drive wheel to hold the cab stationary. The exact value of holding torque required would vary with payload, and this holding torque value would be calculated/adjusted by incorporating measurements of the total weight (gravitational force) exerted by the cab and any payload immediately prior to start-up by means of instrumentation (e.g., load cells) mounted within the frame of the cab (e.g., attachment points for tractive drive units and/or underneath the platform supporting any payload). Once the required level of holding torque is generated, as confirmed by instrumentation mounted within each tractive drive unit (e.g., load cells, ammeters), the secondary braking system and/or parking brake would be disengaged, transferring the full weight of the cab to the drive wheel(s) of the tractive drive unit(s) of the cab. Upon disengagement of the parking brake and/or secondary braking system, if any loss of traction (e.g., slippage) and/or rollback of the drive wheels, due to gravitational forces, is detected by means of instrumentation mounted within the cab and/or tractive drive units (e.g., drive wheel output shaft torque reduction via load cell, unexpected acceleration via inertial measurement unit), one or more tractive drive units may assume one or more corrective actions, including: increasing current to one or more drive motors to increase output torque, increasing the compressive force generated within the active suspension (thereby increasing friction at the drive wheel interface with the shaft/shaft-mounted rails), or re-engaging the parking brake/secondary braking system. If no loss of traction and/or rollback is detected upon disengagement of the parking brake/secondary braking system during start-up, the cab would initiate a normal motion profile to its next destination.

When operating in cylindrical shafts, each suspension may also be able to rotate about the axis of applied normal force in order to "steer" each drive wheel (on the order of ±15° from vertical) and produce a net rotation of the cab about the vertical axis of travel. The steering angle of each drive wheel in a tractive drive unit would be coupled by means of a centralized transmission (e.g., one beveled output gear to each suspension assembly driven by a central pinion rotating about the axis of vertical travel with torque supplied by a driving worm gear and/or gear box linked to an electric/hydraulic motor) in order to ensure synchronous steering motion of all drive wheels as the cab was made to rotate. This steering mechanism, with/without an additional mechanism to rotate the passenger compartment about the axis of travel as well, would allow the cab to control its rotational position within the circular shaft without the use of guide rails as well as to align itself with passenger access doors to the shaft positioned at nearly any location around the circumference of a circular shaft.

Each cab may also use dynamic braking to both control velocity and recapture some of the kinetic energy of the moving cab into potential energy stored within an onboard energy reservoir (i.e., batteries, ultracapacitors, and/or other similar devices), that would then be used to augment the energy required for subsequent motion. Due to the rapid delivery/removal of energy required for each cab, it is likely that the ideal embodiment of this energy storage/delivery system would include ultracapacitors (to deliver/absorb short-duration high-power bursts) paired with lithium polymer/phosphate batteries for larger energy storage that is slower to charge/discharge.

Each cab may incorporate a secondary braking system that would initiate in the event of parking (holding position as part of nominal operation), a tractive drive system failure (wherein the cab loses partial/full traction with the shaft or shaft-mounted rails in a manner unable to be compensated for with suspension system adjustments), or loss of power. The secondary braking system would be initiated by both electronic control signals (nominal operation) or by an electromechanical/purely-mechanical means in the event of a control system fault (e.g., loss of power, overspeed, seismic/impact shock). When initiated, the secondary braking system would push a plurality of brake shoes/pads/struts from within each cab against the walls of the shaft (See FIG. 3) and/or shaft-mounted guide rails (See FIG. 6) and/or portions of each drive wheel (See FIG. 7) and the ensuing friction would slow, and eventually stop the cab from descending. The kinetic energy of the moving cab could be wholly dissipated mechanically (e.g., thermal effects, deformation, wear) due to the secondary braking system or partially recaptured if combined with the dynamic braking feature of the tractive drive units.

In the event that a cab detects an imminent impact with a shaft obstruction (e.g., another cab), an onboard electronic control system would execute one or more of the following motion-arresting actions: triggering of any "safeties" (e.g., traditional Type A/B/C units which clamp onto shaft-mounted rails), triggering the parking brake and/or secondary braking system to fully/proportionally engage with the shaft and/or shaft-mounted rails, commanding tractive drive unit motor(s) to hold position/produce maximal counter torque, shutting down tractive drive motor(s), and commanding tractive drive unit active suspension(s) to produce maximal compressive forces (to maximize traction of each drive wheel). The exact sequence/combination of such motion-arresting behaviors would be chosen by the cab control system based upon the time permitted prior to any impact, with the severity (i.e., acceleration applied to the cab and occupants) likely to escalate as time to impact decreases.

Each set of cabs, shafts, and "transfer stations" (described below) would form a unique "Hyprlift System" for each building. Because multiple cabs may travel within the same shaft, shafts may be allocated to only upward-traveling cabs or downward-traveling cabs. In a scenario where a plurality of shafts exists, more shafts would be allocated to upward traveling cabs during peak up-demand periods (e.g., beginning of the workday in an office building) and more shafts to cabs traveling downward during peak down-demand periods (e.g., end of the workday in an office building), thereby optimizing the overall passenger throughput of the Hyprlift System. Optimized cab traffic scheduling and/or destination dispatch may be accomplished with a centralized supervisory control system (software and supporting hardware) that would communicate with a plurality of cabs via a private secured wireless network. Alternatively, the Hyprlift System's supervisory control system may be decentralized, with software and processing distributed amongst multiple cabs within the network, all connected by means of a secure wireless mesh network or similar local private wireless communication network topology. Finally, passengers may communicate with the Hyprlift System and hail an elevator cab using user interface consoles at each floor and/or their mobile device, all of which could join the Hyprlift System's wireless communications network and/or utilize encrypted communications through the public internet.

Transfer stations may be added to the otherwise passive shafts at the terminal tops/bottoms and/or intermediate levels throughout the length of the shafts. These stations would consist of electromechanical assemblies that would contain drive systems (e.g., electric motors coupled to one or more belt, chain, rack-and-pinion, or other similar force-transmitting mechanisms) capable of translating hollow, cage-like structures known as "cradles" between adjacent shafts. The cradles would have open internal volumes capable of enclosing one or more cabs along with any portions of shaft and/or rails for the cab tractive drive units and secondary braking systems to grip onto for ingress/egress or to hold position. Depending upon system architecture, the transfer stations could offer purely-linear translation (perpendicular to the vertical axis of travel) or rotational motion, akin to the rotating chambers in a revolver firearm magazine. The transfer stations may replace the removed cradle with another cradle, which may be occupied or empty. Once the translated cab(s) are aligned with the destination shaft(s), any stored cab(s) may exit and resume motion. In addition to transferring cabs between adjacent shafts, the transfer stations may also add/remove cabs from service for maintenance and/or storage, both of which would likely be located at the base of the shaft network of each Hyprlift System. Regardless of system architecture, the transfer stations would also include an internal emergency power supply (e.g., battery pack) to allow completion of a limited number of cab transfers even in the event of a loss of power from the building.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

The invention claimed is:

1. An elevator tractive drive system, comprising:

a plurality of wheels coupled to an elevator cab, the plurality of wheels configured to compress into one or more shaft-mounted rails and/or one or more interior shaft wall surfaces, wherein the plurality of wheels are powered by one or more motors coupled to a transmission configured to deliver regulated torque to the plurality of wheels;

at least one sensor configured to measure one or more physical parameters related to kinematics of the cab and/or the plurality of wheels;

at least one sensor configured to measure one or more physical parameters related to a mass or a weight of the elevator cab and any payload;

at least one actuator configured to generate, with or without additional articulating coupling members to the cab, a regulated compressive force at a wheel-rail interface and/or a wheel-shaft interface;

at least one sensor configured to measure one or more physical parameters related to compressive forces generated at a wheel-rail or wheel-shaft interface; and a controller configured to receive input from each of the sensors and activate the at least one actuator and/or the one or more motors, to generate or adjust regulated compressive force and associated tractive force delivered at the wheel-rail interface and/or the wheel-shaft interface.

2. The elevator tractive drive system of claim 1, wherein the controller comprises:

one or more processor(s), computer-readable memory, and a communication circuit, the computer readable memory storing one or more programs or computer instructions that can be executed by the processor to record and act upon data pertaining to the operation of the elevator tractive drive system of claim 1 as well as transmit that data and receive instructions from external devices.

3. The elevator tractive drive system of claim 1, wherein the controller is configured to activate the at least one actuator or motors in response to input from the sensors to apply corrective changes to the at least one actuator, motors, braking system, or any combination thereof.

4. The elevator tractive drive system of claim 1, wherein the transmission is further configured to generate a tractive force at a wheel-rail interface and/or a wheel-shaft wall interface.

5. The elevator tractive drive system of claim 1, wherein the physical parameters related to kinematics of the cab comprising one or more of: jerk, acceleration, velocity, displacement and rotation.

6. The elevator tractive drive system of claim 1, wherein the physical parameters related to a mass or a weight of the elevator cab and any payload comprising one or more of: tensile force, compressive force and strain.

7. The elevator tractive drive system of claim 1, wherein the physical parameters related to compressive forces generated at the wheel-rail or wheel-shaft interface comprising one or more of: tensile force, compressive force and strain.

8. The elevator tractive drive system of claim 1, further comprising:

a braking system configured to operate the motors as generators, thereby converting kinetic energy of a cab and attached elevator tractive drive system back into electrical energy, the braking system also comprising the following components:

a plurality of actuators and coupled structural members which are configured to press a plurality of pads or shoes into one or more shaft-mounted rails, one or more interior shaft wall and/or surfaces in order to dissipate kinetic energy of a cab mechanically;

at least one sensor measuring one or more physical parameters related to operation of the braking system; and a controller configured to trigger the braking system upon the loss of electrical power and/or electrical control signal from the controller.

9. The elevator tractive drive system of claim 8, wherein the physical parameters related to the operation of the braking system comprise one or more of:

electric drive motor voltage, electric drive motor current, electric drive motor torque, electric drive motor rotation, braking system force, braking system structural member strain, cab jerk, cab acceleration, cab velocity and cab displacement.

10. The elevator tractive drive system of claim 8, wherein the electrical energy be stored and/or dissipated.

11. The elevator tractive drive system of claim 8, wherein the braking system generates tractive forces to retard or arrest cab motion via the plurality of pads or shoes.

* * * * *